Nov. 24, 1959     G. C. PARKER ET AL     2,914,270
VEHICLE ATTACHED WIRE STRETCHING AND REELING DEVICE
Filed Sept. 16, 1955     3 Sheets-Sheet 1

George C. Parker
Purvis N. Taylor
INVENTORS

BY

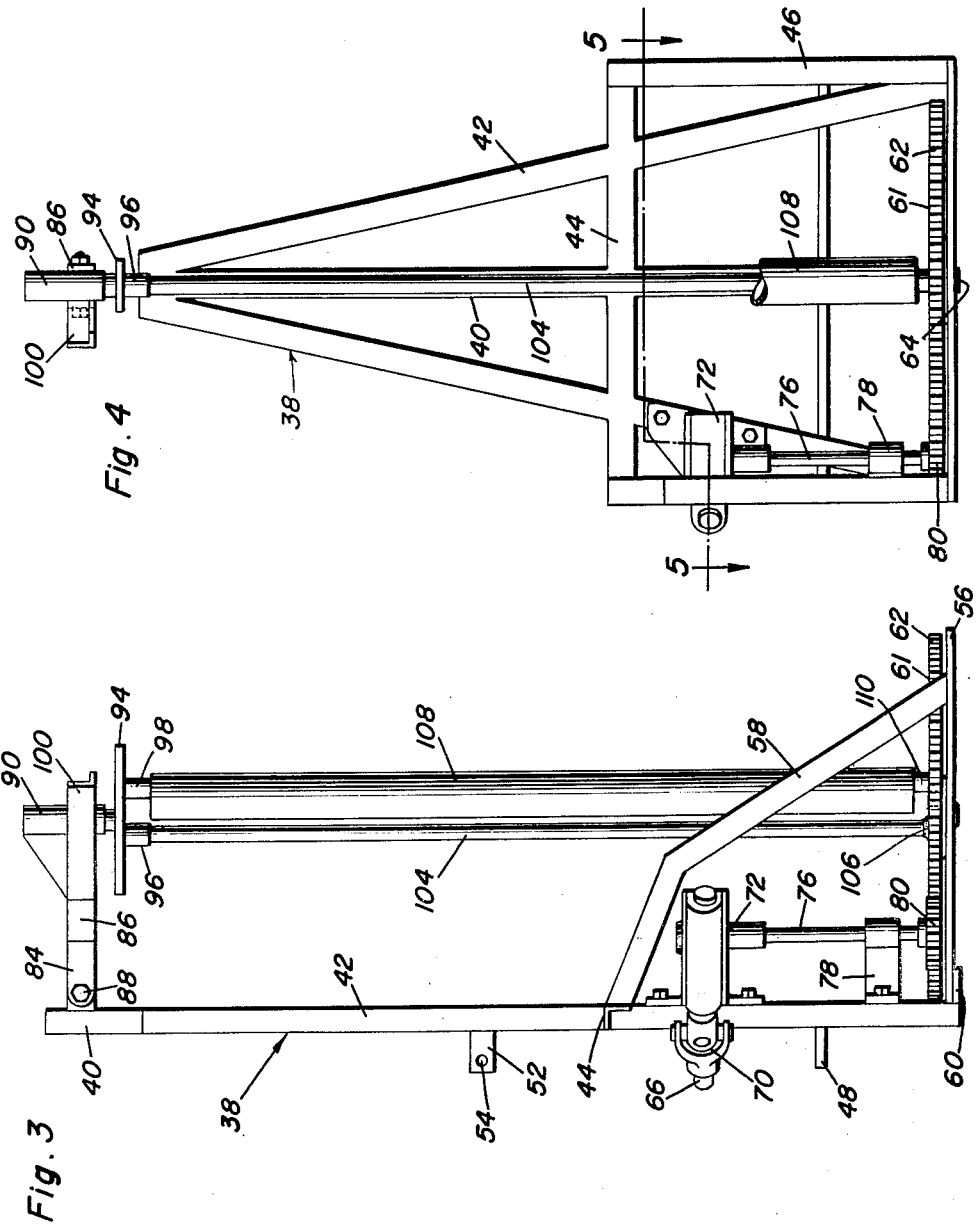

Nov. 24, 1959 G. C. PARKER ET AL 2,914,270
VEHICLE ATTACHED WIRE STRETCHING AND REELING DEVICE
Filed Sept. 16, 1955 3 Sheets-Sheet 3
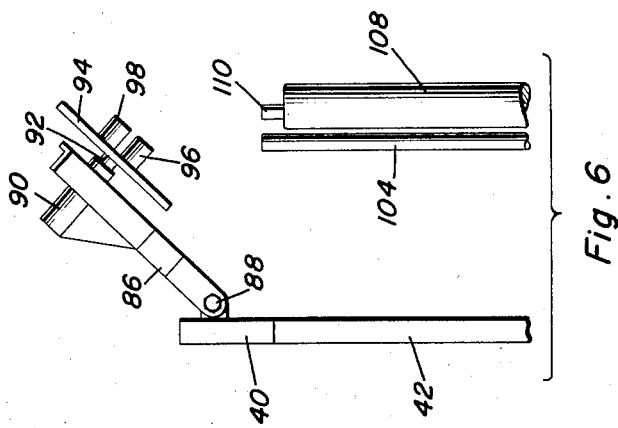
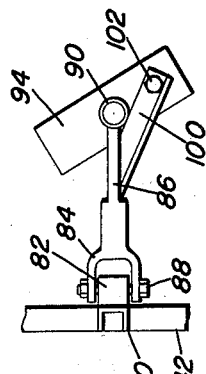
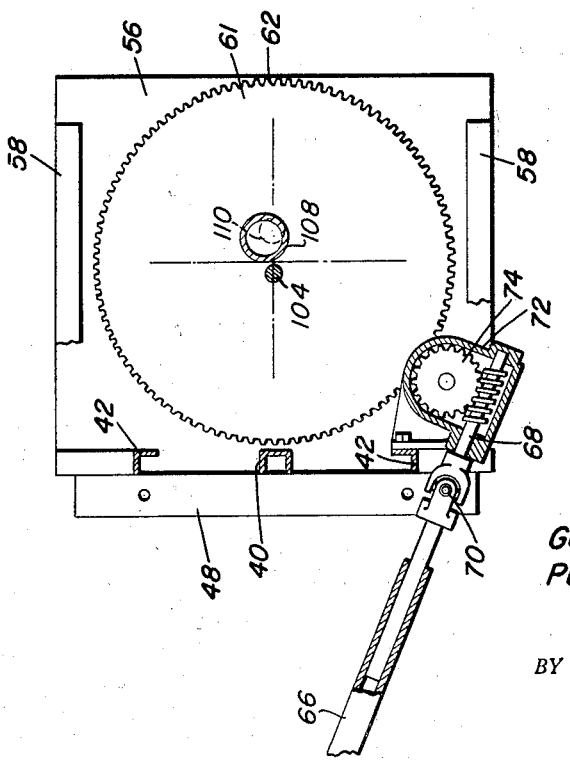
George C. Parker
Purvis N. Taylor
INVENTORS

United States Patent Office 2,914,270
Patented Nov. 24, 1959

2,914,270

VEHICLE ATTACHED WIRE STRETCHING AND REELING DEVICE

George C. Parker and Purvis N. Taylor, Ozark, Ala.

Application September 16, 1955, Serial No. 534,642

13 Claims. (Cl. 242—86.5)

This invention generally relates to a wire handling device, and more specifically provides a device which may be attached to a vehicle, such as a tractor, having a three point suspension especially adapted for stretching and reeling wire.

In the construction of wire fences and especially those constructed of woven wire, the labor of several persons is normally required inasmuch as the spool of wire is normally elongated, heavy and bulky, and it is necessary that the wire be rolled out on the ground or alongside the posts by two persons while others position, stretch and staple the wire to the post. This operation is tedious, slow and extremely inefficient. Accordingly, it is the primary object of the present invention to provide a device especially adapted for attachment to farm tractors which may be employed for picking up a spool of wire, unreeling the wire as it is attached to the posts, and stretching the wire with only the tractor operator necessary for stringing the wire on the posts.

Another object of the present invention is to provide a wire stretching and reeling device adapted to be attached to that type of farm tractor having what is known as a three point suspension which includes a pair of lift arms wherein a supporting platform and upstanding framework is provided for attachment to the lift arms and a rotatable wire spool holding means is provided for pivotal movement from a vertical position to a horizontal position wherein a spool of wire may be picked up from a horizontal position on the ground to a vertical position for unreeling.

A further object of the present invention is to provide a wire stretching and reeling device as set forth in the preceding objects which includes an eccentric member extending through the spool of wire as well as a stationary rod wherein the eccentric member may be moved toward the stationary rod for clamping a portion of the wire therebetween to permit the wire to be stretched.

A further important object of the present invention is to provide a wire stretching and reeling device in accordance wtih the preceding objects especially adapted for attachment to a tractor having a power take-off wherein the wire may be wound onto the spool as well as permitted to unwind and the stretching operation may be conducted by positioning the tractor in a stationary position and reeling the wire back onto the spool, thereby tensioning the wire already unreeled from the spool of wire.

Yet another important object of the present invention is to provide a wire stretching and reeling device which may be employed with woven wire or a plurality of spools or barbed wire wherein the position of the spool or spools of wire may be vertically adjusted for retaining the wire in proper position in relation to the ground surface due to the mounting of the device on a tractor having lift arms thereon.

Still another object of the present invention is to provide a device defined in the preceding objects which may also be employed for removing fences, since the wire may be wound upon the spool holding device and the posts may be extracted from the ground by utilizing the lift device of the tractor after which the staples may be removed, thereby permitting the expeditious removal of wire fencing.

Other important objects of the present invention will reside in its simplicity of construction, ease of attachment, efficiency of operation, adaptation for its various purposes, and its relatively inexpensive manufacturing and maintenance costs.

These together with the other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view of the attachment per se;

Figure 4 is a rear elevational view of the attachment with the upper part of the tubular eccentric member broken away to illustrate the rigid rod extending from the rotatable platform;

Figure 5 is a top plan sectional view taken substantially upon a plane passing along section line 5—5 of Figure 4 illustrating the relationship of the rigid rod and eccentric tubular member in wire clamping relation together with the drive mechanism for the rotatable platform;

Figure 5a is a detailed view of the rod and eccentric member in remote relation for expansion against the inner surface of a wire spool;

Figure 6 is a detail side elevational view illustrating the interconnecting plate at the upper end of the rigid rod and eccentric member together with the pivotal bracket to permit assembly of the device in relation to a spool of wire; and Figure 7 is a top plan view of the construction of Figure 6 illustrating the means for preventing rotation of the interconnecting upper plate.

Figure 1:
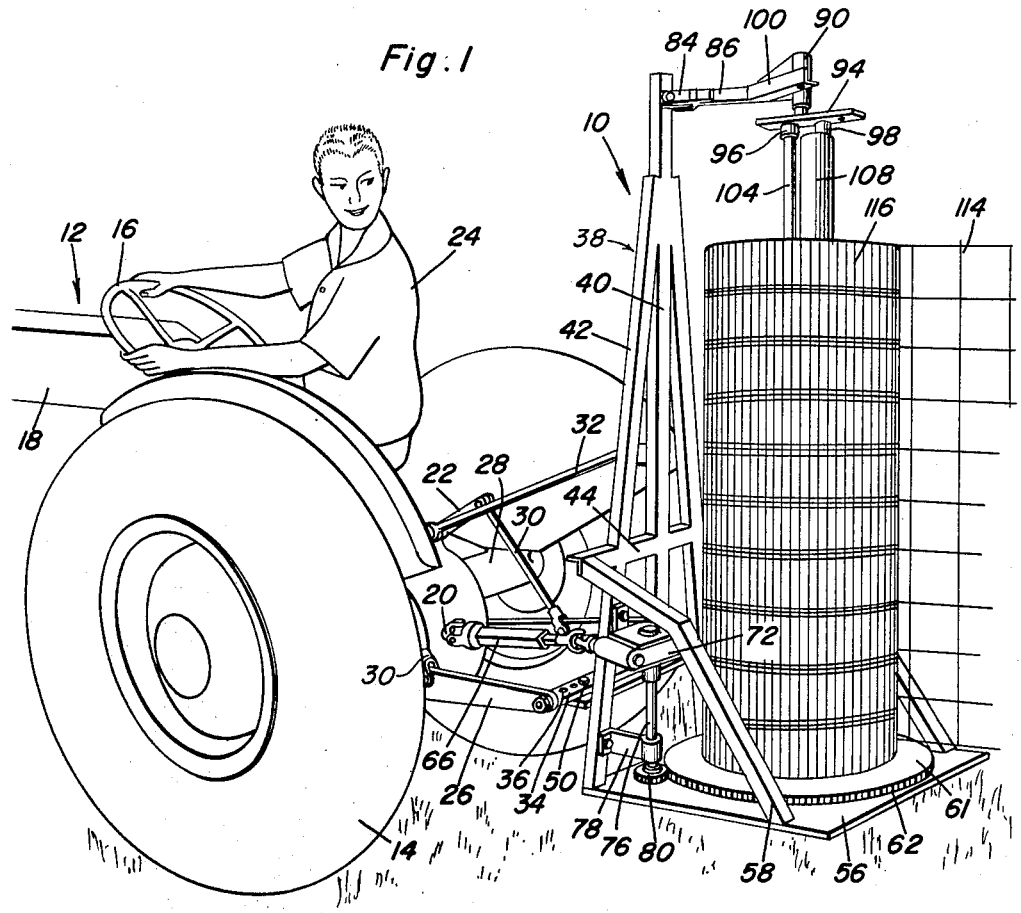
Figure 1 is a perspective view illustrating the wire stretching and reeling device of the present invention attached to the rear of a tractor wherein the spool of wire is in position for unreeling the wire therefrom, or for stretching the wire already unwound.
Figure 2:
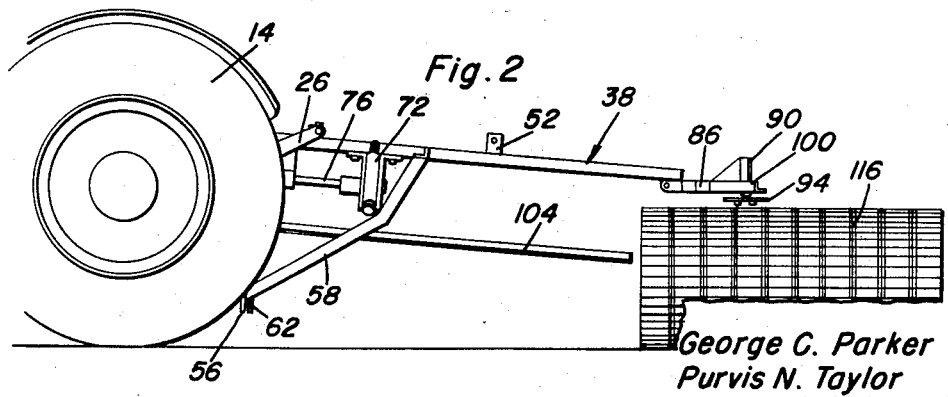
Figure 2 is a side elevational view illustrating the manner of picking up a spool of wire disposed in horizontal position on the ground surface.

Referring now specifically to the drawings, the numeral 10 generally designates the wire stretching and reeling device of the present invention which is adapted to be attached and powered from a tractor generally designated by the numeral 12, wherein the tractor 12 includes the usual rear driving wheels 14, steering wheel 16, frame and body 18, a power take-off 20, a pair of lift arms 22, and a seat for an operator 24.

The tractor 12 includes a three point suspension which incorporates a pair of arms 26 pivotally supported from the rear axle housing 28 and a pair of lift links 30 interconnecting the outer ends of the lift arms 22 and the pivotal support arms 26 for movement of the support arms 26 in a vertical plane. An interconnecting arm or link 32 is provided between the arms 26 in vertically spaced relation thereto and is pivotally attached to the axle housing 28 for supporting the attachment 10 in a normal vertical position. The outer ends of the arms 26 are interconnected by a drawbar 34 having a plurality of openings or holes 36 thereon for attachment of the wire stretching and reeling device of the present invention as set forth hereinafter. The tractor construction as set forth above is generally conventional and is defined for specifically relating the illustrated form of the invention, although it will be understood that the wire stretching and reeling devcie 10 may be employed with other types of tractors or with other types of vehicles.

Referring now specifically to Figures 3–7, it will be seen that the attachment 10 generally includes a vertically disposed upright frame generally designated by the numeral 38 which includes a central member 40 and a pair of outer upwardly diverging members 42, thereby forming substantially a triangular frame which is interconnected by transverse braces 44 which extend beyond the outer members 42 and are connected to vertical frame members 46.

The rear surface of the frame 38 is provided with a projecting attaching plate 48 for attachment to the drawbar 34 by fastening members 50, as illustrated in Figure 1. Attached to the central member 40 in vertically spaced relation to the plate 48 is an attaching lug 52 having an aperture therein designated by the numeral 54 for detachable engagement with the end of the interconnecting arm 32 wherein the frame 38 is attached to the hitch mechanism of the tractor 12 at three points formed by the ends of the arms 26 which are interconnected by the drawbar 34 and the end of the arm 32 wherein vertical movement of the frame 38 will retain the frame 38 in substantially a vertical position in all positions of elevation.

Extending rearwardly from the bottom end of the frame 38 is an enlarged platform 56 which is supported by angulated side brace members 58 as well as a rearwardly projecting plate 60 on the lower end of the frame 38. Journaled on the platform 56 is an enlarged circular support plate 61 which is provided with peripheral gear teeth 62, as illustrated in Figure 5. The plate 61 is rotatably journaled on and secured to the plate 56 by retaining bearing means 64 wherein the plate 61 may rotate on the platform 56 but may not be removed therefrom.

For driving the plate 61, a telescopic drive shaft 66 is universally attached to the power take-off 20 of the tractor 12 and is universally attached to a worm gear 68 through a universal coupling 70. The worm gear 68 is journaled in a reduction gear housing 72 having a driven worm pinion gear 74 journaled therein wherein the worm pinion is attached to a vertically disposed drive shaft 76 having its upper end journaled in the housing 72 and its lower end journaled in a bearing 78 mounted on the frame 38. The lower end of the shaft 76 is provided with a spur drive pinion 80 in meshing engagement with the gear teeth 62 on the circular plate 61, thereby driving the circular plate 61 in a rotational manner at a greatly reduced speed. The telescopic construction of the drive shaft 66 permits the plate 61 to be driven at various elevational and angular positions in relation to the tractor 12, thereby permitting operation of the attachment at substantially any position in relation to the tractor 12.

Disposed at the upper end of the central member 40 of the frame 38 is a rearwardly projecting lug 82 for pivotally receiving the U-shaped yoke 84 of a rearwardly extending bracket 86 which is mounted on the lug 82 by a fastening bolt 88, thereby permitting the bracket 86 to be pivoted about a substantially horizontal axis to a position generally longitudinally extending from the frame 38 or generally perpendicular in relation thereto. The outer end of the bracket 86 is provided with a tubular portion 90 rotatably journaling a shaft 92 on which is supported on the inner end thereof an interconnecting plate 94 which is normally disposed in spaced parallel relation to the plate 61. The interconnecting plate 94 is provided with a pair of depending downwardly opening sockets 96 and 98 connected thereto. The sockets 96 and 98 are both disposed eccentrically of the rotational center of the plate 94 for a purpose described hereinafter. The bracket 86 is provided with a projecting member 100 which extends in angular relation to the bracket 86 and a fastening bolt 102 is provided for extending downwardly through the member 100 and the plate 94 for locking the plate 94 in non-rotative relation to the bracket 86.

Extending upwardly and rigidly connected to the circular plate 60 is a vertically elongated rod 104 that is secured to the plate 60 as by welding 106 or the like. The upper end of the rod 94 is detachably received in the socket 96 on the plate 94. An elongated cylindrical tubular member 108 is supported between the plates 60 and 94 and the tubular member 108 is provided with eccentric stub shafts 110 at each end thereof with the lower stub shaft 110 being detachably and rotatably received within an opening in the plate 61 and the upper stub shaft 110 is rotatably and detachably received within the socket 98 on the interconnecting plate 94 wherein the tubular member 108 may be rotated about the eccentric stub shafts 110 and is normally disposed in parallel relation to the rod 104 for movement towards and away from the rod 104 in parallel relation. This will permit the end of a piece of wire, such as the woven wire 114, to be positioned between the rod 104 and the eccentric member 108 and to be clamped therebetween for stretching the wire 114 and also permits the spool of wire 116 to be supported between the plates 61 and 94 with the spool of wire 116 being disposed in vertical position and resting upon the plate 61.

The spool of wire 116 is normally elongated and relatively heavy wherein it is desirable that the spool of wire 116 be lifted from the ground surface for laying in a horizontal position. In order to do this, the bracket 86 is pivoted upwardly, thereby pivoting the sockets 96 and 98 from the upper ends of the rods 104 and the upper stub shaft 110 on the tubular member 108. The fastening member 88 will frictionally retain the bracket 86 in coextensive relation to the frame 38. The tubular member 108 is completely removed by disengaging the lower stub shaft 110 from the plate 61, after which the frame 38 and rod 104 are moved to a substantially horizontal position, as illustrated in Figure 1, by disengaging the arm 32 from the lug 52 and raising the lift arms 26 upwardly. This will permit the tractor 12 to be moved rearwardly with the rod 104 being inserted through the spool of wire 116. As the spool of wire 116 comes into contact with the upper surface of the circular plate 61, the lift arms 26 may be lowered until such time as the rear or bottom end of the platform 56 engages the ground surface, at which time the tractor 14 may be moved forwardly, thereby pivoting the frame 38 upwardly as the lift arms 26 continue to lower. When the bracket 38 has assumed substantially a vertical position by continued lowering of the lift arms 26 and forward movement of the tractor 12, the link 32 may then be attached to lug 52 and the entire apparatus may then be raised to any desired elevational position. However, it is pointed out that prior to raising of the frame 38, the tubular member 108 is inserted through the spool 116 while the spool 116 is still in horizontal position. The bracket 86 is then moved to a position for engaging the sockets 96 and 98 with the ends of the rod 104 and tubular member 108 respectively. After this action is carried out, the device may be raised to a vertical position as previously described and then raised to any suitable elevation by employing the lift arms 22 which are connected to the vertically movable and swingable support arms 26 and the drive shaft 66 may be connected for rotating the spool 116 if desired.

In the stringing of fence from the woven wire 114, the wire 114 may be unreeled from the spool 116 by forward movement of the tractor 12 or by proper rotational movement of the power take-off 20 if the power take-off is reversible. When it is desired to stretch the wire 114, the tractor 12 may be stopped and the power take-off 20 operated for rotating the plate 61 wherein the spool 116 will be rotated for winding the wire 114 thereon, thereby stretching the wire that has already been strung out alongside a plurality of vertical fence posts. As an alternative the end of the wire 114 may be clamped between the rod 104 and the tubular member 108 and the tractor 12 moved forwardly for stretching the wire. The clamping action between the tubular member 108 and the rod 104 is performed due to the eccentricity of the tubular member 108 wherein it will move bodily towards the rod 104. When the wire is disposed between the tubular member 108 and the rod 104 so that the tendency of the wire to move outwardly from between the rod 104 and tubular member 108 will cause the tubular member 108 to move towards the rod 104 wherein the clamping action of the two members will be increased as the force on the wire is increased. This will permit tightening of the wire 114 by forward movement of the tractor 12 or by rotational movement of the wire spool holding means by actuating the power take-off 20. The wire spool actuating means or holding means includes the plates 61 and 94 and the rod 104 and the tubular member 108. The tubular member 108 may also be rotated for movement away from rod 104 for gripping the inner circumference of the spool of wire 116 when desired.

Also, the present device may be employed for removing fencing wherein the end of the fence wire may be attached between the rod 104 and the tubular member 108 and wound thereon until a post is contacted. At this point, the platform 56 may be elevated by utilizing the tractor lift mechanism, thereby raising the post out of the ground after which the staples may be removed therefrom and the operation may continue at each post, thereby permitting the fence to be rapidly and efficiently removed with very little damage thereto to permit reuse thereof at a later date.

Also, it will be understood that while a power device has been employed, it will be seen that the device may be employed without the power mechanism wherein the device will render all of the functions except the reeling of wire back onto the spool 116 as when removing fencing. However, the device which is not powered may be employed to stretch the wrie 114 by clamping the ends of the wire 114 between the eccentric tubular member 108 and the rod 104 and permitting the tractor 12 to move slowly forward, whereby the wire will be stretched after the plate 94 has been locked to the bracket 86 by the offset member 100 and the fastening bolt 102.

The present invention eliminates considerable labor normally necessary for lifting and handling a rather heavy spool of wire and may be employed for reeling and unreeling wire from a plurality of spools of barbed wire or single strand wire which may be stacked one upon the other on the plate 61.

The foregoing is considered as illustrative only of the principles of the invetnion. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adapted to move bodily in relation to the central member for gripping a portion of the wire therebetween, and means for preventing unwinding rotation of the spool of wire and the plates to permit the unreeled wire to be stretched.

2. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adpted to move bodily in relation to the central member for gripping a portion of the wire therebetween, and means for preventing unwinding rotation of the spool of wire and the plates to permit the unreeled wire to be stretched, the vehicle having a power take-off, and means connected to the power take-off for driving said plate on the platform thereby rotating the spool of wire for winding wire thereon.

3. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adapted to move bodily in relation to the central member for gripping a portion of the wire therebetween, and means for preventing unwinding rotation of the spool of wire and the plates to permit the unreeled wire to be stretched, said bracket being pivotally attached to the upper end of the frame to permit the entry of the upstanding members into the spool of wire, said upstanding members adapted to be lowered to a horizontal position for insertion into the spool of wire.

4. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adapted to move bodily in relation to the central member for gripping a portion of the wire therebetween, and means for preventing unwinding rotation of the spool of wire and the plates to permit the unreeled wire to be stretched, said eccentric upstanding member including a cylindrical member, stub shafts mounted eccentrically in each end thereof and being journaled in the plates for movement of the cylindrical member in parallel relation to the central upstanding member.

5. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adapted to move bodily in relation to the central member for gripping a portion of the wire therebetween, and means for preventing unwinding rotation of the spool of wire and the plates to permit the unreeled wire to be stretched, said bracket being pivotally attached to the upper end of the frame to permit the entry of the upstanding members into the spool of wire, said upstanding members adapted to be lowered to a horizontal position for insertion into the spool of wire, the vehicle having a power take-off, and means connected to the power take-off for driving said plate on the platform thereby rotating the spool of wire for winding wire thereon.

6. An attachment for a vehicle comprising a horizontally disposed platform, an upstanding frame mounted on the forward edge of the platform, means for supporting the frame and platform on the vehicle for vertical and pivotal movement, a plate rotatably mounted on said platform, a central upstanding member on said plate, an eccentric upstanding member mounted on said plate in spaced parallel relation to the central upstanding member, an interconnecting plate at the upper ends of said upstanding members, a bracket attached to the upper end of the frame and rotatably supporting the interconnecting plate, said upstanding members adapted to be disposed within the center of a spool of wire for reeling and unreeling the wire, said eccentric member adapted to move bodily in relation to the central member for gripping a portion of the wire therebetween, and means for preventing unwinding rotation of the spool of wire and the plates to permit the unreeled wire to be stretched, said bracket being pivotally attached to the upper end of the frame to permit the entry of the upstanding members into the spool of wire, said upstanding members adapted to be lowered to a horizontal position for insertion into the spool of wire, the vehicle having a power take-off, and means connected to the power take-off for driving said plate on the platform thereby rotating the spool of wire for winding wire thereon, said eccentric upstanding member including a cylindrical member, stub shafts mounted eccentrically in each end thereof and being journaled in the plates for movement of the cylindrical member in parallel relation to the central upstanding member.

7. In combination with a tractor having a power take-off and a three point hitch including a pair of lift arms, a wire stretching and reeling attachment comprising a vertical member attached to said hitch for adjustment in a vertical plane, a horizontally disposed supporting platform extending rearwardly from the vertical member, means for supporting a spool of wire from the platform and vertical member, and means connected to said power take-off for rotating a spool of wire disposed on said supporting means, said supporting means including a support plate rotatably supported on the upper surface of said platform, an elongated upstanding rod rigidly attached to said support plate, an elongated member parallel to the rod, a stub shaft mounted eccentrically at each end of said elongated member, one of said stub shafts journaled in said circular plate, a plate detachably interconnecting the upper end of said rod and the other stub shaft and permitting rotation of the elongated member about the eccentric stub shafts thereby moving the elongated member in parallel relation to the upstanding rod to clamp wire therebetween, a bracket pivotally attached to the upper end of the vertical member and rotatably supporting said interconnecting plate to permit the rod and elongated member to be received through a spool of wire with the spool of wire disposed on the support plate.

8. In combination with a tractor having a power take-off and a three point hitch including a pair of lift arms, a wire stretching and reeling attachment comprising a vertical member attached to said hitch for adjustment in a vertical plane, a horizontally disposed supporting platform extending rearwardly from the vertical member, means for supporting a spool of wire from the platform and vertical member, and means connected to said power take-off for rotating a spool or wire disposed on said supporting means, said supporting means including a circular plate rotatably supported on the upper surface of said platform, an elongated upstanding rod rigidly attached to said circular plate, an elongated member parallel to the rod, a stub shaft mounted eccentrically at each end of said elongated member, one of said stub shafts journaled in said circular plate, a plate detachably interconnecting the upper end of said rod and the other stub shaft and permitting rotation of the elongated member about the eccentric stub shafts thereby moving the elongated member in parallel relation to the upstanding rod to clamp wire therebetween, a bracket pivotally attached to the upper end of the vertical member and rotatably supporting said interconnecting plate to permit the rod and elongated member to be received through a spool of wire with the spool of wire disposed on the circular plate, said rotating means including peripheral gear teeth on the circular plate, a telescopic drive shaft connected to the power take-off, and reduction gear mechanism interconnecting the drive shaft and circular plate for rotating the circular plate and a spool of wire mounted thereon.

9. The combination of claim 8 together with means for locking the interconnecting plate non-rotatively to the bracket thereby preventing rotation of the circular plate, upstanding rod and upstanding elongated member about a vertical axis thereby precluding rotation of a spool of wire mounted on the circular plate when the elongated member is moved away from the upstanding rod thereby clampingly engaging the inner surface of the spool of wire.

10. For use in conjunction with a self-powered vehicle, an attachment for rotatably supporting a spool of wire for stretching and reeling, said attachment comprising a supporting frame adapted to be attached to the vehicle, wire spool holding means rotatably supported on said frame, means for providing selective rotation of said wire spool holding means thereby permitting reeling and unreeling of the wire from the spool, and means on said wire spool holding means for gripping the wire thereby permitting the wire to be stretched by forward movement of the vehicle when the wire spool holding means is prevented from rotating, said wire spool holding means including a pair of plates journaled on said frame, a rod extending between said plates, one of said plates being removable to permit insertion of the rod through a spool of wire, an elongated member extending between the plates in spaced parallel relation to the rod, said member being mounted on eccentric stub shafts rotatably journaled in said plates for movement in parallel relation to the rod for clampingly engaging wire between the rod and elongated member.

11. For use in conjunction with a self-powered vehicle, an attachment for rotatably supporting a spool of wire for stretching and reeling, said attachment comprising a supporting frame adapted to be attached to the vehicle, wire spool holding means rotatably supported on said frame, means for providing selective rotation of said wire spool holding means thereby permitting reeling and unreeling of the wire from the spool, and means on said wire spool holding means for gripping the wire thereby permitting the wire to be stretched by forward movement of the vehicle when the wire spool holding means is prevented from rotating, said wire spool holding means including a pair of plates journaled on said frame, a rod extending between said plates, one of said plates being removable to permit insertion of the rod through a spool of wire, an elongated member extending between the plates in spaced parallel relation to the rod, said member being mounted on eccentric stub shafts rotatably journaled in said plates for movement of the member in parallel relation to the rod for clampingly engaging the wire therebetween, said rod and member receiving an end of the wire therebetween for holding the wire for stretching, said clamping action of the eccentrically mounted elongated member being increased as the tension of the wire is increased.

12. For use in conjunction with a self-powered vehicle, an attachment for rotatably supporting a spool of wire for stretching and reeling, said attachment comprising a supporting frame adapted to be attached to the vehicle, wire spool holding means rotatably supported on said frame, means for providing selective rotation of said wire spool holding means thereby permitting reeling and unreeling of the wire from the spool, and means on said wire spool holding means for gripping the wire thereby permitting the wire to be stretched by forward movement of the vehicle when the wire spool holding means is prevented from rotating, said wire spool holding means including a pair of plates journaled on said frame, a rod extending between said plates, one of said plates being removable to permit insertion of the rod through a spool of wire, a cylindrical member extending between the plates in spaced parallel relation to the rod, said member being mounted on eccentric stub shafts rotatably journaled in said plates for movement of the member in parallel relation to the rod for clampingly engaging the wire therebetween, said rod and member receiving an end of the wire therebetween for holding the wire for stretching, said clamping action of the eccentrically mounted member being increased as the tension of the wire is increased, said frame, rod and member being vertically disposed for receiving a vertically disposed spool of wire for disposing the wire alongside a series of vertical fence posts for forming a fence.

13. An attachment for a self-powered vehicle comprising a platform mounted on the vehicle for pivotal movement about a substantially horizontal axis, an upstanding rod supported from said platform for swinging movement in a vertical plane from a generally horizontal position in which it may be inserted into a spool of wire to a vertical position in which it retains the spool of wire in vertical position for rotation about a generally vertical axis for facilitating the reeling and unreeling of wire from the spool for forming a fence, means coacting with said upstanding rod for clamping engagement with the wire, and means for effecting selective rotation and non-rotation of the rod and wire spool for reeling and unreeling wire therefrom and permitting the wire to be stretched when the vehicle is moved longitudinally with the wire spool held stationary, said platform being provided with an upstanding frame member and a bracket attached to the frame member and detachably interconnecting the upper end of the rod and the frame member for supporting the upper end of the rod and permitting entry of the spool of wire onto the rod.

References Cited in the file of this patent

UNITED STATES PATENTS

| | | |
|---|---|---|
| 404,536 | Guthridge | June 4, 1889 |
| 973,134 | Northrop | Oct. 18, 1910 |
| 1,214,772 | Fouts | Feb. 6, 1917 |
| 2,171,034 | Kriegbaum et al. | Aug. 29, 1939 |
| 2,207,893 | Nash et al. | July 16, 1940 |
| 2,586,376 | Picton | Feb. 19, 1952 |
| 2,605,976 | Henggeler | Aug. 5, 1952 |
| 2,616,636 | Aden | Nov. 4, 1952 |
| 2,677,476 | Bebbinger | May 4, 1954 |